Patented Feb. 27, 1945

2,370,572

UNITED STATES PATENT OFFICE 2,370,572

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application November 13, 1941, Serial No. 419,032

8 Claims. (Cl. 260—78)

This invention relates to unsaturated carbonate esters which are polymerizable to form valuable products as hereinafter described. The compounds are esters of (a) carbonic acid and (b) a partial ester of a polyhydroxy compound and an unsaturated monobasic acid.

Common chemical nomenclature and terminology has been used when possible. Frequently, however, chemical expressions may have several accepted meanings. It is therefore necessary to define the scope of these ambiguous expressions which must necessarily be used to describe the invention.

The expression "polyacidic compound" has been used herein in the generic sense to include all compounds having two or more acid groups (i. e., acidic OH or —COOH) and which do not contain a free alcohol type of hydroxyl group. The expression is intended to include simple polybasic inorganic acids such as boric, silicic, carbonic, sulphuric, or phosphoric acids, the simple polycarboxylic acids such as oxalic, adipic, succinic, maleic, fumaric, tricarballylic, phthalic, diphenyldicarboxylic or naphthalic acids, the simple heterocyclic acids such as quinolinic, cinchomeronic, ethylene oxide-α,α-dicarboxylic or cotarinic acids, or the simple ether acids such as diglycolic, dilactic, and the corresponding thioether acids or methoxy-succinic acids, and the more complex ester acids which contain esters such as glycolyl acid malonate HOOC—CH₂—O—CO—COOH, ethylene bis (acid sulphate)

HO—SO₂—O—C₂H₄—O—SO₂—OH the acid carbonate of lactyl lactic acid

HOOC—CH(CH₃)—O—CO—
       CH(CH₃)—O—CO—OH diglycolyl oxalate

HOOC—CH₂—O—CO—CO—O—CH₂—COOH etc.

The expression "polyhydroxy compounds" is intended to be generic to all compounds having two or more hydroxyl groups which do not have any free acid groups. The hydroxy groups must obviously not be attached directly to carbonyl groups. The expression includes the simple polyhydroxy alcohols such as ethylene glycol, propylene glycol, butylene glycol, trimethylene glycol, pentamethylene glycol, glycerine, methylglycerol, erythritol, or pentaerythritol; the sugars such as glucose, lactose, sucrose, or maltose; the polymers of polyhydroxy alcohols such as di-, tri-, and tetraethylene glycol, di-, tri-, and tetrapropylene glycol, the polybutylene glycols, polyglycerols, etc.; the cyclic polyhydroxy compounds such as pyrogallol, hydroquinone, 2,5-bis (hydroxymethyl) furan, 3,5-dihydroxycoumarone, dioxanediols, or p,p-dihydroxy-diphenyl ether, and the polyhydroxy esters such as ethylene dilactate

CH₃—CHOH—CO₂—C₂H₄—CO₂—CHOH—CH₃ bis (hydroxyethyl) carbonate (HO—C₂H₄)₂—CO₃, glycol monoglycolate

HO—C₂H₄—O—CO—CH₂OH or diethylene glycol bis (hydroxyethyl carbonate) (HOC₂H₄—CO₃—C₂H₄)₂O.

The expression "hydroxy acid" is used in the broad sense to include all compounds having both acidic groups and alcoholic hydroxyl groups. The generic expression includes aliphatic hydroxy acids such as citric, hydroxy butyric, tartaric, leucinic, saccharic, hydroacrylic, malic, ricinoleic, acetonic, glyceric, lactic and glycolic acids, the aromatic hydroxy acids such as salicylic, gallic, resorcylic, phloritic and coumaric acids, and the heterocyclic hydroxy acids such as berberonic, alpha-furyl glycolic and 3-hydroxy-coumarone carboxylic (2) acid

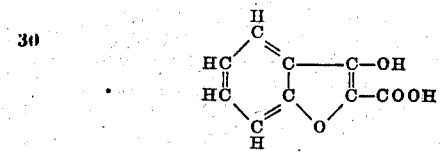

The generic expression hydroxy acids also includes the ester hydroxy acids including theoretical acids such as hydroxyethyl carbonate HO—C₂H₄—CO₂—OH, lactyl lactic acid

CH₃—CHOH—CO₂—CH(CH₃)COOH and 2-(hydroxyethyl) ethyl carboxymethyl carbonate

HO—C₂H₄—O—C₂H₄—O—CO₂—CH₂COOH or glycol monacid sulphate

HO—C₂H₄—O—SO₂—OH

It is necessary to differentiate between compounds which contain ester linkages between the reactive groups of the compound and those which do not. Accordingly, the expression "polyacidic ester" has been used herein to refer to the class of polyacidic compounds which contain at least one ester linkage between a pair of carboxyl groups. They, of course, contain at least two reactive acidic groups and may not contain reactive alcoholic hydroxy groups. The expressions "simple polyacid" or "simple polybasic acid" are used to denote compounds of more simple structure having no ester linkages in the molecules between the acid groups. Similarly, the expression "polyhydroxy ester" includes the compounds having at least two alcoholic hydroxy groups and no reactive acidic groups but which also contain at least one ester linkage between a pair of hydroxyl groups. The simple polyhydroxy compounds are acid-free compounds in which the hydroxyl groups are not separated by an ester linkage and the simple hydroxy acids are compounds containing acid and hydroxyl groups which are not separated by an ester linkage. These simple compounds, may, however, contain more stable, less easily hydrolyzed groups such as ether or thioether groups.

For example, the compound derived by reacting allyl lactate with phosgene has the following probable structure:

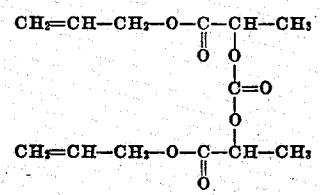

and may be considered to be an allyl ester of the polyacidic compound

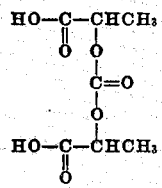

However, since this acid contains ester groups between the acid groups, it is not a simple polyacidic compound but is a polyacidic ester. Additionally, however, the above allyl ester may be regarded as a partial ester of the simple polyacid carbonic acid and allyl alcohol. Oxalic, malonic, or diglycolic acids are simple polyacidic compounds. Likewise, glycol, diethylene glycol, or glycerol, etc., are simple polyhydroxy compounds and lactic, ricinoleic, and glycolic acid are simply hydroxy acids.

It will be apparent that many of the acids, hydroxy compounds, and hydroxy acids contemplated within the above definitions may not exist as such in the free state and, consequently, may be theoretical compounds. Since their esters may be prepared, however, it is often convenient to regard such esters as esters of such theoretical acids.

The new esters contain one or more groups derived from unsaturated monobasic acids, preferably having up to five carbon atoms such as acrylic, methacrylic, alphaethyl acrylic, alphaaminoacrylic, crotonic, vinylacetic, tiglic, angelic, propiolic, tetrolic, pentinoic, or the corresponding halogen substituted acids such as alpha- or betachloroacrylic, chlorocrotonic, or the bromoacrylic acids. Unsaturated acids having six to ten carbon atoms are also useful such as hexenic, tereacrylic, amylpropiolic, cinnamic, or phenylpropiolic acids.

The new unsaturated esters are the mono or diesters of (a) carbonic acid and (b) an ester containing a free hydroxy group and which is a partial ester of a polyhydroxy compound and an unsaturated acid. Such partial esters are for convenience termed "hydroxy esters." Several types of such hydroxy esters are contemplated.

The first type of the monohydroxy ester is the partial ester of a simple polyhydroxy compound and an unsaturated monocarboxylic acid. Suitable esters are glycol monoacrylate, glycerol diacrylate, diethylene glycol monoacrylate, dipropylene glycol monoacrylate, triethylene glycol monoacrylate, resorcinol monoacrylate, pyrogallol diacrylate, pentaerythritol triacrylate, etc., and the corresponding methacrylates, crotonates, tiglates, cinnamates, chloroacrylates, etc. These hydroxy esters may be prepared by partially esterifying a simple polyhydroxy compound with an unsaturated monocarboxylic acid. The reaction is usually conducted in the presence of an esterification catalyst such as phenolsulphonic acid or toluenesulphonic acid and also in the presence of a polymerization inhibitor such as hydroquinone, pyrogallol, etc.

A second type of hydroxy ester includes the mixed esters of (a) simple polyhydroxy compound and (b) monohydroxy acid and (c) a simple unsaturated monobasic acid. Suitable esters are ethylene glycol monolactate monomethacrylate, resorcinol monolactate monomethacrylate, glycerol monolactate dimethacrylate, triethylene glycol monolactate monomethacrylate, glycerol monoacrylate monolactate monostearate and the corresponding acrylates, cinnamates, tiglates, chloracrylates, etc., and the corresponding glycolates, salicylates, leucinates, etc. Preferably, this class of hydroxy acid contains but a single group derived from the hydroxy acid and the remaining groups of the polyhydroxy compound are esterified with an unsaturated acid or acids or with an unsaturated acid and a saturated acid. These hydroxy esters may be prepared by partially esterifying a chlorhydrin such as ethylene chlorhydrin, propylene chlorhydrin, etc. with an unsaturated monobasic acid and then reacting the resulting compound with a silver salt of an hydroxy acid. They may also be made by ester interchange reactions or by partially saponifying a polyester and reacting the partial ester with the acid or acid chloride in question.

A third type of hydroxy ester includes the mono or polymer of (A) a simple polyhydroxy compound and (B) an acid ester which is an ester of (a) simple monohydroxy acid and (b) an unsaturated monobasic acid. Suitable hydroxy esters are ethylene glycol mono (acrylyl lactate) HO—$C_2H_4$—O—CH($CH_3$)—O—CO—$C_2H_3$, diethylene glycol mono (acrylyl lactate), glycerol bis (acrylyl lactate), pyrogallol bis (acrylyl lactate), etc., and the corresponding methacrylates, chloracrylates, crotonates, etc., and the corresponding glycolates, salicylates, leucinates, etc. These hydroxy esters may be prepared by reacting the acid chloride of an ester of unsaturated monobasic acid and an hydroxy acid with an excess of a simple polyhydroxy compound. They may alternatively be prepared by reacting the silver salt of an ester of unsaturated acid and a simple hydroxy acid with a chlorhydrin such as ethylene chlorhydrin, propylene chlorhydrin, etc.

A fourth type of hydroxy ester includes the esters of (a) a partial ester of a polyhydroxy compound and a monobasic unsaturated acid such as glycol monoacrylate and (b) an acid ester of a polybasic acid and an polyhydroxy compound such as the phthalic acid monoester of ethylene glycol

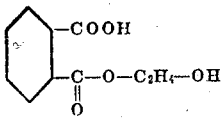

and two or more moles of a simple polyhydroxy compound. Suitable hydroxy esters of the fourth type are hydroxyethyl methacryloxyethyl phthalate, glycerol bis (glycol monophthalate methacrylate) HO — C$_3$H$_5$ — (O—CO—C$_6$H$_4$—CO—O—C$_2$H$_4$ — O — CO — C$_3$H$_5$)$_2$, pyrogallol bis (glycol phthalate methacrylate), etc., and the corresponding succinates, adipates and the corresponding derivatives of propylene glycol, diethylene glycol, triethylene glycol, etc. These esters may be prepared by reacting a silver salt of a polybasic acid with a chlorhydrin and subsequently treating the resulting hydroxy ester with the acid chloride of an unsaturated acid.

Preferred forms of the unsaturated hydroxy esters are those which are composed of dihydroxy compounds, dibasic and monohydroxy monoacids. These may be represented by the formulae:

(1) —Z—R
(2) —Y—Z—R
(3) —Z—Y—R
(4) —Z—X—Z—R in which R is the radical of an unsaturated monobasic acid, X is the radical of a dibasic acid, Y is the radical of a monohydroxy monoacid and Z is the radical of a dihydroxy compound.

The new esters may be mono- or di- esters of carbonic acid or complex acids derived from carbonic acid and any of the above enumerated hydroxy esters. The symmetrical esters may be prepared by reacting the hydroxy esters with phosgene in the presence of an alkaline reagent such as pyridine or the carbonates, oxides, and hydroxides, of alkali or earth alkali metals. This reaction substitutes an ester radical for each chlorine of the phosgene:

2EOH+COCl$_2$→E—O—CO—O—E+2HCl where E is the radical of the hydroxy ester.

Other symmetrical modifications may be prepared by reacting simple polyhydroxy compounds with phosgene to form the polychloroformates which are then reacted with the hydroxy esters in the presence of alkaline agents:

2EOH+Cl—CO—O—R—O—CO—Cl→
E—O—CO—O—R—O—CO—O—E+2HCl

Unsymmetrical modifications may be prepared by reacting one of the hydroxy esters with phosgene to produce the chloroformate which may then be reacted with a different hydroxy ester to produce carbonates of the following type:

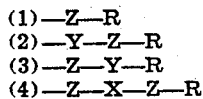

in which E$_1$ and E$_2$ are different organic radicals derived from hydroxy esters. Thus, glycol monoacrylate may be reacted with phosgene to form the ester, glycol monoacrylate monochloroformate. This product may then be reacted with one of the above hydroxy esters such as glycol monomethacrylate, or glycol monolactate monoacrylate, etc., to form a carbonate ester. In accordance with a further modification, other mixed esters may be prepared by reaction of one of the above hydroxy esters such as glycol monoacrylate or glycol monoacrylate monolactate with a chloroformate of a saturated or unsaturated alcohol such as the chloroformates of allyl, methallyl, crotyl, propargyl, oleyl, furfuryl, methyl, ethyl, propyl, hexyl, lauryl, or stearyl alcohols or ethers such as propargyl, allyl, methallyl, ethyl, methyl, or butyl cellosolve. Often the method of preparation may be such as to produce a mixture containing the desired ester and other esters formed due to side reactions. Such mixtures may be difficult to fractionate due to the high boiling points of the products and for many purposes these mixtures may be used as such after removal of water soluble impurities and distillation of low boiling materials.

The new esters in most cases may be recovered as distinct chemical compounds having a predetermined number of ester linkages, usually less than seven and rarely as many as ten, within a single molecule.

The esters are generally colorless, high boiling liquids although in some cases they may be solids of relatively low melting point. They are usually miscible in solvents such as benzene, toluene, chloroform, diethyl ether, carbon tetrachloride, and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

The most important uses of the new compositions involves their polymerizability in the presence of heat and/or light or other catalyst to yield solid or liquid compositions of widely different physical properties. The polymerization is preferably conducted in the presence of catalysts such as oxygen, ozone, or organic peroxides such as lauryl, benzoyl, and acetone peroxides.

The products of polymerization vary greatly in their physical properties, depending upon the extent of polymerization. In general, the polymers are transparent and colorless and upon polymerization a variety of polymer compositions may be produced. Esters containing a single unsaturated group may be polymerized to form thermoplastic compositions. On the other hand, esters which contain two or more unsaturated groups which are unconjugated with respect to the carbonate group may be polymerized to form fusible polymers or infusible polymers, depending upon the extent of polymerization.

In the ultimate state of polymerization the polymers of polyunsaturated esters are substantially unaffected by acids, alkalies, water, and organic solvents. Intermediate polymers having a wide range of properties may be secured. Upon the initial polymerization of liquid monomers or solutions of the monomers in suitable solvents an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents, and containing as well a substantial portion of soluble material which may be monomer and/or soluble fusible polymer. These gels are soft and bend readily. However, they are fragile and crumble and tear under low stresses. They may be further polymerized in the presence of catalysts to the final infusible insoluble state.

The polyunsaturated monomers may be cast polymerized directly to the insoluble, infusible state. This procedure is subject to certain inherent difficulties due to the reduction in volume during the polymerization. Often, during polymerization strains are established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide temperatures of 65 to 80° C. are suitable, while for acetone peroxide, the temperatures of 140 to 150° C. may be used. This soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air or other polymerization inhibitor. Thus, a sheet is produced which is hard and smooth on one side while being soft and tacky on the other. The sheet may then be finished by coating the tacky side with monomer or syrupy polymer and polymerizing it in contact with a smooth plate to the infusible insoluble state. Often it is found desirable to release the polymer from the plate one or more times during polymerization of the coating in order to minimize formation of cracks or other surface defects. These methods are described and claimed in an application for Letters Patent Serial No. 392,111, filed May 6, 1941, by Vincent Meunier and an application Serial No. 398,241, filed June 16, 1941, by Irving E. Muskat.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene-diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization, and preferably, at reduced pressures. The fusible polymer is thus obtained in stable form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of 2-5 percent of benzoyl peroxide until the viscosity of the solution has increased about 100 to 500 percent. This may require several hours of heating at 65-85° C. in the presence of benzoyl peroxide. When the resulting viscous solution is poured into an equal volume of water, methyl or ethyl alcohol, glycol or other nonsolvent for the fusible polymer, a polymer usually in the form of a powder or a gummy precipitate is formed which may be filtered and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of the monomer from the polymer, or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial proportion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and use as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1 to 5 percent of benzoyl peroxide generally in a heated mold. The polymers may be mixed with fillers such as alpha-cellulose, wood pulp and other fibrous substances, mineral fillers or pigments such as zinc oxide or calcium carbonate, lead chromate, magnesium carbonate, calcium silicate, etc., plasticizers, such as the saturated alcohol esters of phthalic acid, camphor, the saturated alcohol esters of maleic, fumaric, succinic, and adipic acids or di- or trimethylene glycol bis (butyl carbonate). The polymerized molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate, or mixtures thereof, is useful as a liquid coating composition. Objects of paper, metal, wood, cloth, leather, or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final insoluble infusible state.

While the polymerization of the polyunsaturated compounds is of particular interest, because of their comparative infusibility, it should also be noted that monounsaturated compounds such as the reaction product of glycol monoacrylate with an alkyl chloroformate may be polymerized to form thermoplastic resinous products by means of heat and/or light and in the presence of usual polymerization catalysts. Syrups, powders, and cast or molded sheets of such polymers may be obtained.

The following examples are illustrative:

Example I

One mole of diethylene glycol monomethacrylate (174 grams) was dissolved in 1000 cc. of benzene and 200 grams of pyridine. Phosgene gas was bubbled through at a rate of 20 millimoles per minute for one-half hour. During the reaction the temperature was maintained below 12° C. by cooling on an ice bath. When the reaction was completed the mixture was warmed slightly to evolve the excess phosgene. The benzene solution of the ester was washed with dilute HCl and with water and finally dried over sodium sulphate. The benzene was evolved by heating gently in the presence of one percent hydroquinone at reduced pressures. The ester was a colorless liquid having the probable structure:

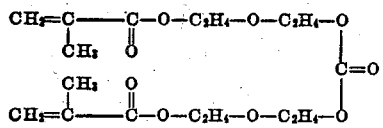

The ester polymerized upon heating to 70° C. in the presence of 0.5 percent benzoyl peroxide for several hours to form a clear hard product.

Example II

The diacrylate of glycerol was prepared by reacting two moles of sodium acrylate with a single mole of glycerol dichlorohydrin. One mole (200 grams) of this ester was mixed with 100 grams of pyridine and 1000 cc. of benzene. 115 grams of diethylene glycol dichloroformate was added slowly while maintaining the reaction temperature below 10° C. by means of an ice bath. After the addition was completed, the reaction mass was permitted to stand for one hour. The benzene solution was washed with dilute HCl and water and finally dried with anhydrous sodium sulphate. The benzene was evaporated by heating at reduced pressures in the presence of one percent hydroquinone. The ester was a colorless liquid which is believed to have the structure:

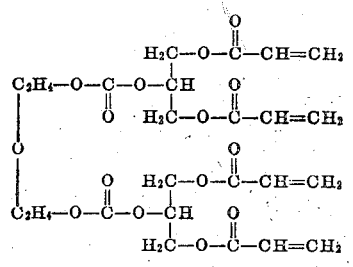

Upon heating with 0.5 percent benzoyl peroxide at 90° C. the ester polymerized to a clear hard solid.

Example III

Eighty-five grams of α-methacryloxy propionic acid were heated to 60° C. in 1000 cc. of benzene. Ethylene oxide was passed into the mixture for one hour at a rate of 5 to 10 millimoles per minute. The benzene solution was cooled to approximately 0° C. and phosgene was bubbled through at a rate such that the temperature of the mixture remained below 10° C. at all times. When the solution became saturated and the reaction was complete, the resulting chloroformate solution was washed with water and dried. The benzene was removed from the chloroformate by heating at reduced pressures. Fifty-five grams of glycol monomethacrylate were dissolved in 1000 cc. of benzene and 75 grams of pyridine in a two-liter flask. The mixture was cooled to −2° C. with a salt-ice mixture. The chloroformate was then added slowly at the rate of two grams per minute for fifteen minutes and then at the rate of 3 to 5 grams per minute for one-half hour. After all of the chloroformate had been added the mixture was permitted to stand for three hours. The ester was then washed with water and dried. The benzene was removed by distillation at 2 to 10 mm. pressure. The product was a colorless liquid mixture believed to contain the ester:

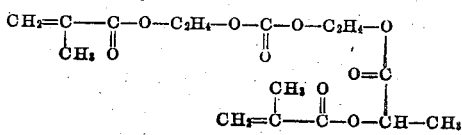

Example IV 100 grams of the monoester of glycol and α-methacryloxy propionic acid prepared as described in Example III was dissolved in 1000 cc. of benzene and mixed with 60 grams of pyridine. 90 grams of propylene glycol dichloroformate made by saturating propylene glycol with phosgene at reduced temperatures was added dropwise at a rate of one to two grams per minute. During the reaction the mixture was maintained at temperatures between 0° C. and +10° C. The benzene solution of the ester was washed with dilute HCl, with Na₂CO₃ solution and finally with water. After drying, one gram of activated charcoal was added and the benzene was distilled off at an absolute pressure of 2–8 mm. of mercury. After filtering, a water-white liquid ester was obtained. Its structural formula was believed to be:

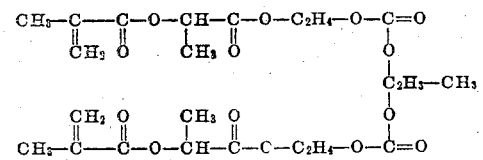

The ester polymerized upon heating to 150° C. in the presence of 0.5 percent acetone peroxide to form a clear, hard, substantially infusible polymer.

*Example V*

One mole (131 grams) of ethylene glycol monomethacrylate was mixed with 1000 cc. of benzene and 100 grams of pyridine. The mixture was cooled to +5° C. on an ice bath. The cooled mixture was stirred vigorously while phosgene was bubbled in at a rate of 15 millimoles per minute. During the reaction the temperature varied between +5 and +14° C. The benzene solution was washed with water and dried over Na₂SO₄. The benzene was removed by heating at the boiling point at 5–10 mm. total pressure. The ester was a colorless liquid having the structure:

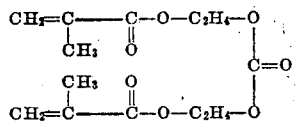

The ester polymerized upon heating to 80° C. with 0.2 percent benzoyl peroxide.

*Example VI*

240 grams of propylene glycol monoacrylate, 200 grams of pyridine and 1500 cc. of benzene were mixed in a three-liter flask equipped with a stirring rod. A slight excess of phosgene (1.05 moles) was bubbled in slowly over a period of one hour. The reaction mixture was maintained between the temperatures of +2 and +10° C. by submerging the reaction vessel in an ice bath. The benzene solution was washed with water and dried with Na₂SO₄. The benzene and ester were separated by distillation. The unsaturated ester was a colorless liquid believed to have the structure:

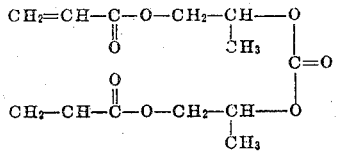

*Example VII*

A quantity of the ester prepared in Example I was heated in the presence of benzoyl peroxide at 70° C. with a solid gel containing approximately 60 percent insoluble material being obtained. This gel was then ground to a powder and molded under 4000 pounds per square inch at 110° C. to form a clear molded polymer which was substantially insoluble.

Although the present invention has been described with respect to certain specific details, it is not intended that such details shall be limitations upon the scope of the invention except as they are incorporated in the following claims.

This case is a continuation-in-part of Serial No. 361,280, filed October 15, 1940, by Irving E. Muskat and Franklin Strain.

We claim:

1. Bis (ethylene glycol monoacrylate) carbonate.
2. Bis (propylene glycol monomethacrylate) carbonate.
3. Bis (diethylene glycol monomethacrylate) carbonate.
4. A polymer of the ester defined by claim 1.
5. A polymer of the ester defined by claim 2.
6. A polymer of the ester defined by claim 3.
7. As a new compound, a derivative of carbonic acid wherein each acid group of the carbonic acid is esterified with a half ester of a glycol and a monocarboxylic acid of from 2 to 10 carbon atoms containing a single unsaturated carbon-to-carbon linkage in an aliphatic chain, said linkage being attached to the beta carbon atom.
8. A polymer of the ester defined by claim 7.

IRVING E. MUSKAT.
FRANKLIN STRAIN.